US008651811B2

(12) United States Patent
Danielson

(10) Patent No.: US 8,651,811 B2
(45) Date of Patent: Feb. 18, 2014

(54) CONTROL LOGIC FOR A PROPELLER SYSTEM

(75) Inventor: David R. Danielson, Suffield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 2265 days.

(21) Appl. No.: 11/281,194

(22) Filed: Nov. 16, 2005

(65) Prior Publication Data

US 2007/0110577 A1 May 17, 2007

(51) Int. Cl.
*B64C 11/30* (2006.01)
(52) U.S. Cl.
USPC ................................................. 416/30; 416/49
(58) Field of Classification Search
USPC .......... 416/27, 30, 35, 43, 44, 49; 415/15, 16, 415/20, 26, 30; 244/181; 701/3
See application file for complete search history.

(56) References Cited

U.S. PATENT DOCUMENTS

| 2,740,483 A | 4/1956 | Machlanski |
| 2,851,113 A | 9/1958 | Irwin et al. |
| 4,533,296 A | 8/1985 | Duchesneau et al. |
| 4,588,354 A | 5/1986 | Duchesneau et al. |
| 4,645,420 A | 2/1987 | Warner |
| 4,653,981 A | 3/1987 | Harner et al. |
| 4,687,410 A * | 8/1987 | Cline et al. ....................... 415/17 |
| 4,711,615 A | 12/1987 | Rusu |
| 5,017,089 A | 5/1991 | Schneider et al. |
| 5,029,091 A * | 7/1991 | Schneider et al. .............. 701/99 |
| 5,213,471 A | 5/1993 | Miller et al. |
| 5,331,559 A | 7/1994 | High et al. |
| 5,416,699 A | 5/1995 | DiValentin et al. |
| 6,282,882 B1 | 9/2001 | Dudd, Jr. et al. |
| 6,371,081 B1 | 4/2002 | Hawkins et al. |
| 6,422,023 B1 | 7/2002 | Dudd, Jr. et al. |
| 6,511,292 B2 | 1/2003 | Perkinson et al. |

FOREIGN PATENT DOCUMENTS

| EP | 0392968 | 10/1990 |
| EP | 0436231 | 7/1991 |
| WO | 9951868 | 10/1999 |

OTHER PUBLICATIONS

European Search Report dated Oct. 1, 2010, Application No. 06255854.9-2422/1787906.

* cited by examiner

*Primary Examiner* — Nathaniel Wiehe
(74) *Attorney, Agent, or Firm* — Carlson, Gaskey & Olds PC

(57) ABSTRACT

A propeller control system includes a propeller control logic subsystem in conjunction with an engine control logic subsystem to provide an optimized transition from forward to reverse speed governing under all operating conditions. By creating a Propeller control Mode (PCM) map relative the blade angle and Power Lever Angle (PLA), the minimum blade angle allowed for forward speed governing and the maximum blade angle allowed for reverse speed governing is determined. By combining the actual propeller blade angle, the min and max angles for speed governing, and the PLA signal, the state of the propeller speed governor is determined.

5 Claims, 8 Drawing Sheets

| TIME | THROTTLE | BETA | AIRSPEED | PROP SPEED (%Np) | ZONE BETA | ZONE TRA | PROPELLER CONTROL MODE | COMMENT |
|---|---|---|---|---|---|---|---|---|
| 0 | 15 | 83 | 0 | 0 | 1 | 1 | 1 | ENGINE START |
| 10 | 15 | 83 | 0 | 10 | 1 | 1 | 1 | UNFEATHER |
| 20 | 15 | -4 | 0 | 70 | 2 | 1 | 4 | " |
| 25 | 20 | 7 | 0 | 70 | 2 | 2 | 5 | TAXI |
| 27 | 20 | 7 | 20 | 70 | 2 | 2 | 5 | " |
| 30 | 25 | 18 | 25 | 70 | 1 | 3 | 3 | " |
| 32 | 25 | 18 | 30 | 70 | 1 | 3 | 3 | " |
| 34 | 25 | 18 | 30 | 70 | 2 | 3 | 3 | " |
| 36 | 15 | -4 | 30 | 70 | 2 | 1 | 4 | " |
| 40 | 15 | -4 | 30 | 70 | 1 | 1 | 4 | " |
| 41 | 65 | 18 | 35 | 100 | 1 | 3 | 6 | TAKE-OFF |
| 43 | 65 | 20 | 50 | 100 | 1 | 3 | 3 | " |
| 45 | 65 | 22 | 60 | 100 | 1 | 3 | 3 | " |
| 47 | 65 | 24 | 70 | 100 | 1 | 3 | 3 | " |
| 49 | 65 | 26 | 80 | 100 | 1 | 3 | 3 | " |
| 51 | 65 | 28 | 90 | 100 | 1 | 3 | 3 | " |
| 53 | 65 | 30 | 100 | 100 | 1 | 3 | 3 | " |
| 55 | 65 | 28 | 120 | 100 | 1 | 3 | 3 | " |
| 60 | 25 | 28 | 120 | 87 | 1 | 3 | 3 | CRUISE |
| 65 | 25 | 28 | 120 | 87 | 1 | 3 | 3 | " |
| 70 | 25 | 28 | 120 | 87 | 1 | 3 | 3 | LANDING |

*FIG. 5C*

| TIME | THROTTLE | BETA | AIRSPEED | PROP SPEED (%Np) | ZONE BETA | ZONE TRA | PROPELLER CONTROL MODE | COMMENT |
|---|---|---|---|---|---|---|---|---|
| 71 | 20 | 28 | 120 | 90 | 1 | 2 | 2 | REVERSE REQUESTED |
| 75 | 0 | 28 | 120 | 100 | 1 | 1 | 1 | " |
| 76 | 0 | 25 | 115 | 100 | 1 | 1 | 1 | " |
| 77 | 0 | 20 | 110 | 100 | 2 | 1 | 4 | " |
| 78 | 0 | 15 | 105 | 100 | 2 | 1 | 4 | " |
| 79 | 0 | 10 | 100 | 100 | 2 | 1 | 4 | " |
| 80 | 0 | 5 | 95 | 100 | 2 | 1 | 4 | " |
| 81 | 0 | 0 | 90 | 100 | 3 | 1 | 7 | " |
| 82 | 0 | -5 | 85 | 100 | 3 | 1 | 7 | " |
| 83 | 0 | -10 | 80 | 100 | 3 | 1 | 7 | " |
| 84 | 0 | -15 | 75 | 100 | 3 | 1 | 7 | " |
| 85 | 0 | -19 | 70 | 100 | 3 | 1 | 8 | PROP AT FULL REVERSE |
| 99 | 0 | -19 | 0 | 100 | 3 | 2 | 9 | " |
| 99.5 | 20 | -19 | 0 | 100 | 2 | 3 | 6 | " |
| 100 | 65 | -19 | 0 | 100 | 2 | 3 | 3 | " |
| 102 | 65 | 15 | 10 | 100 | 1 | 3 | 3 | " |
| 104 | 65 | 30 | 20 | 100 | 1 | 3 | 3 | " |
| 106 | 65 | 30 | 30 | 100 | 1 | 1 | 1 | BACK TO TAKEOFF |
| 107 | 15 | 30 | 20 | 80 | 1 | 1 | 4 | " |
| 110 | 15 | 15 | 10 | 70 | 2 | 1 | 4 | " |
| 115 | 15 | -4 | 0 | 70 | 2 | 1 | 4 | BACK TO GI |
| 120 | 15 | -4 | 0 | 70 | 2 | 1 | 4 | " |

*FIG. 5C CONT'D*

CONTROL LOGIC FOR A PROPELLER SYSTEM

BACKGROUND OF THE INVENTION

The present invention relates to a propeller control system, and more particularly to pitch control logic which controls a transition from forward to reverse governing.

Variable pitch propellers are employed on many differing types of aircraft having power plants ranging from piston engines to gas turbines. Conventional propeller control requires knowledge of when to deactivate the propeller speed governor and when the sense of the governor is to be inverted to provide for reverse thrust operation.

The transition from forward to reverse governing requires passage through a zone known as the bucket of the Cp curve (propeller power coefficient versus propeller blade angle for a given advance ratio) where governing is not possible. On the right side of the Cp curve (where the curve has a positive slope), the speed governor must increase propeller blade angle as input power is increased to maintain a fixed speed. On the left side of the Cp curve (where the slope is negative), the governor must do the opposite—decrease blade angle to absorb added power to maintain propeller speed.

The activation and deactivation of the governor logic along with the modification of the sense of the governor logic has been conventionally performed in an open-loop fashion by adjusting constants, timers, or rate limits to permit the passage of the propeller blade angle from the right side of the Cp curve to the left side as the propeller enters the reverse thrust range. Similar constants, timers, and/or rate limits are also required to permit the propeller to leave the reverse thrust region and pass to the right side of the Cp curve where positive thrust is again produced. This conventional open loop adjustment provides a control system which effectively transitions into and out of reverse. However, conventional systems are typically optimized for only a subset of possible aircraft operating conditions and typically possess minimal control adjustment parameters for other speeds or altitudes of operation such that the propeller system may produce unacceptable levels of propeller speed overshoot or undershoot when not operating at the optimized aircraft operating condition.

Accordingly, it is desirable to provide a propeller control system which optimizes propeller performance over the entire flight envelope.

SUMMARY OF THE INVENTION

A propeller pitch control logic system according to the present invention generally includes a propeller control logic subsystem which communicates with an engine control logic subsystem. A pilot thrust request is input into the system as a Power Lever Angle (PLA) input. The PLA signal is related to operating conditions such as Full Reverse (FR); Ground Idle (GI); Flight Idle (FI); and Takeoff (TO). Based on propeller operating conditions and PLA signal, the Propeller control logic subsystem determines a Propeller Control Mode (PCM) which determines the proper state of the propeller governor. The state of the propeller governor is selected from one of the following: Forward governing active; Reverse governing active; or Governors disabled.

The propeller control logic subsystem is utilized in conjunction with the engine control system logic subsystem to provide an optimized transition from forward to reverse speed governing under all operating conditions. By creating a PCM map of the blade angle with the propeller minimum power coefficient based on operating condition (Mach number and propeller speed), the minimum blade angle allowed for forward speed governing and the maximum blade angle allowed for reverse speed governing is determined. By combining the actual propeller blade angle, the min and max angles for speed governing, and the PLA signal, the status and sense of the propeller speed governor is determined. Based on these inputs, a PCM map look-up is performed to find the associated PCM cell and configure the propeller system for the proper control algorithms for all operating conditions and flight crew actions.

In addition to operating at all conditions, the present invention maintains closed-loop control of propeller speed for the maximum time possible whereas traditional methods control the propeller in an open-loop fashion. The closed-loop control method of operation permits the propeller speed governors to remain active for a greater percentage of time. This serves to minimize the magnitude of propeller overspeeds and/or propeller underspeeds that may otherwise occur during transitions into and out of reverse.

The present invention therefore provides a propeller control system which has optimized propeller performance over the entire flight envelope.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 5C is a table delineating the parameters graphed in FIG. 5A.

DETAILED DESCRIPTION OF THE PREFERRED EMBODIMENT

Figure 1:
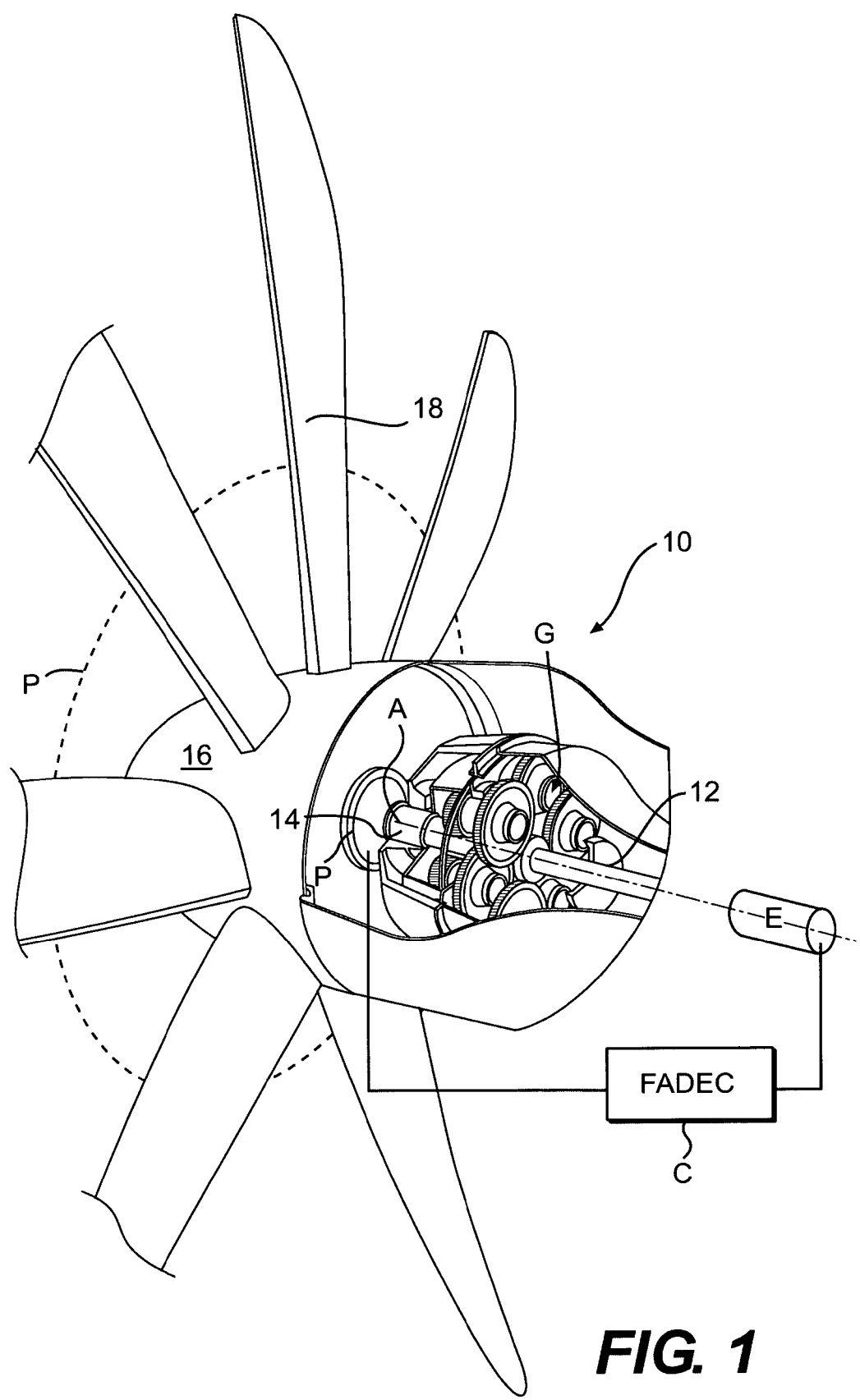
FIG. 1 is a general perspective view an exemplary gas turbine turboprop engine embodiment for use with the present invention.

FIG. 1 illustrates a general perspective view of a propeller system 10 driven by a gas turbine engine (illustrated schematically at E). The engine E rotates a turbine output shaft 12 at a high speed to drive a gear reduction gearbox (illustrated somewhat schematically at G) which decreases shaft rotation speed and increases output torque. The engine E receives speed commands from a control C such as a Fully Automated Digital Electronic Control (FADEC). The gearbox G drives a propeller shaft 14 which rotates a hub assembly 16 and a plurality of propeller blades 18 which extend therefrom. The propeller blades 18 are mounted through a pitch control system P to have the ability to assume a negative blade angle which produces a reverse thrust. When the propeller system 10 is reversed, the propeller blades 18 are rotated below their positive angle, that is, through flat pitch, until a negative blade angle is obtained in order to produce a thrust acting in a direction opposite to forward thrust which, for example only, reduces a landing run, allows reverse taxi the aircraft or facilitates pivot turns.

Figure 2:
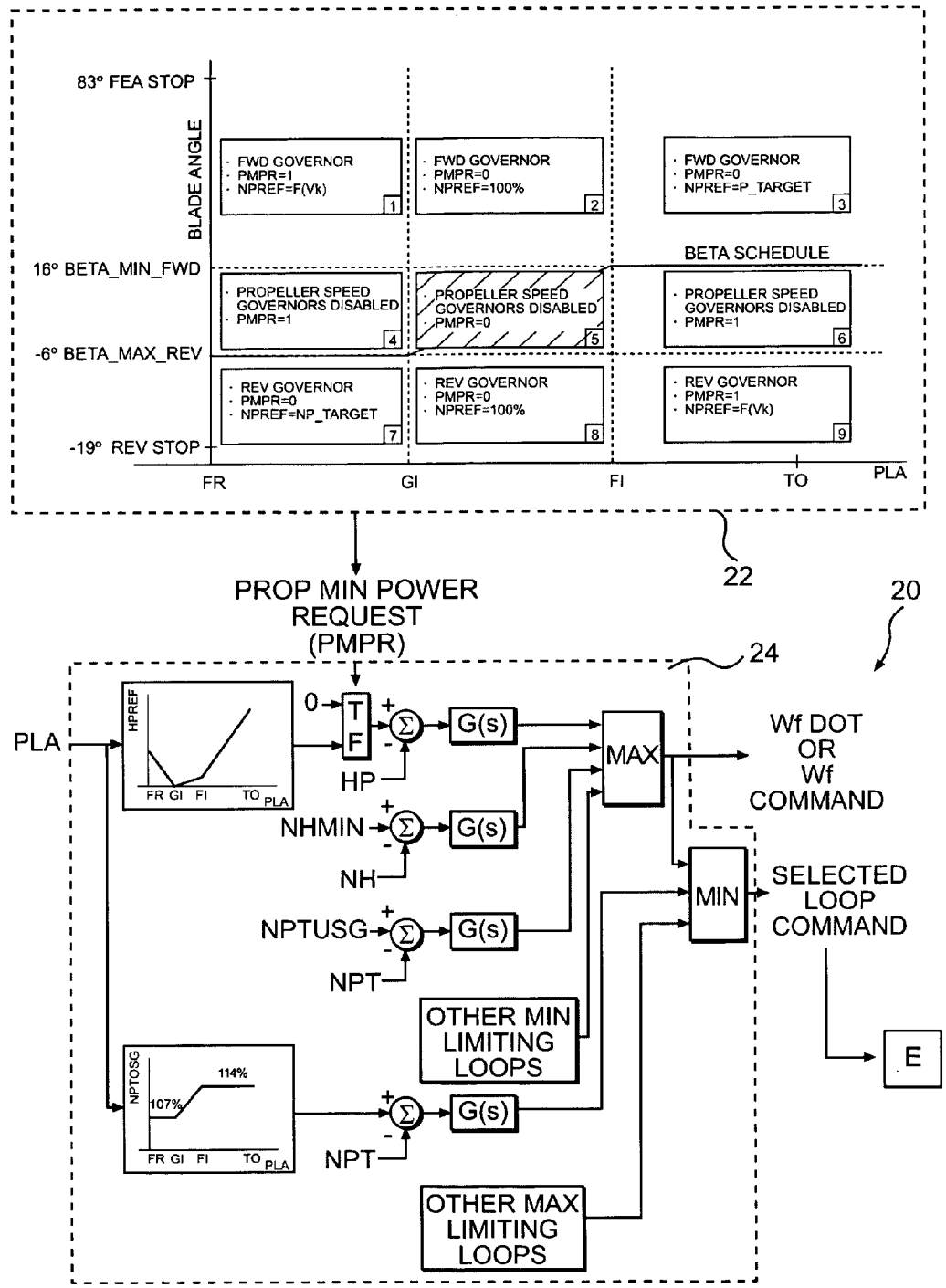
FIG. 2 is a schematic block diagram of a propeller control logic having propeller control logic and engine control logic.

FIG. 2 illustrates a general schematic block diagram of a control system 20 which communicates with the engine E. The control system 20 may include a propeller control logic subsystem 22 which communicates with the engine control logic subsystem 24. It should be understood that the system 20 may be implemented within a higher level system wide control system such as the FADEC (FIG. 1).

A pilot thrust request is preferably input into the system 20 as a Power Lever Angle (PLA) input. The PLA signal is translated into a torque or Horsepower reference signal (HPREF) which is related to operating conditions such as Full Reverse (FR); Ground Idle (GI); Flight Idle (FI); and Takeoff (TO). The HPREF signal is compared with a measured horsepower output within a dynamic control loop which feeds to a MAX comparator. Notably, the HPREF signal is fed to a selector controlled by a Propeller Minimum Power Request (PMPR) signal from the propeller control logic subsystem 22. Other dynamic control loops including Min Allowable Gas Generator Rotational Speed (NHMIN) and Min Allowable Power Turbine Speed (NPTUSG) as well as other MIN limiting loops feed the MAX comparator. Commensurate therewith, a Maximum Allowable Power Turbine Speed (NPTOSG) is compared with a measured power turbine speed (NPT) within a dynamic control loop that feeds a MIN comparator which selects the minimum value between the MAX comparator output, the NPTOSG dynamic control loop, and other Max limiting dynamic control loops. The output from the engine control logic subsystem 24 is the result of the min/max selection logic which generates a signal to the engine E to control a desired amount of fuel which is to be fed to the engine fuel injectors.

Based on the PLA signal and the Propeller control logic subsystem 22 (also illustrated separately in FIG. 3) the proper state of the propeller governor is determined. The governor state is selected from one of the following: Forward governing active; Reverse governing active; or Governors disabled.

The propeller control logic subsystem 22 is utilized in conjunction with the engine control system logic subsystem 24 to provide an optimized transition from forward to reverse speed governing under all operating conditions. By creating a Propeller Control Mode (PCM) map (FIG. 3) of the blade angle with the propeller minimum power coefficient based on operating condition (Mach number and propeller speed), the minimum blade angle allowed for forward speed governing and the maximum blade angle allowed for reverse speed governing is determined. By combining the actual propeller blade angle, the min and max angles for speed governing, and the PLA signal, the status and sense of the propeller speed governor is determined. Based on these inputs, the PCM map is referenced such that a particular PCM cell look-up is performed which will configure the propeller system 10 for all operating conditions and flight crew actions.

In addition to operating at all conditions, the system 20 maintains closed-loop control of propeller speed for a maximum time possible whereas traditional methods control the propeller systems in an open-loop fashion. The closed-loop control method of operation permits the propeller speed governors to be active for a greater percentage of the time which minimizes the magnitude of propeller overspeeds and/or propeller underspeeds that occur during transition into and out of reverse thrust.

Figure 3:
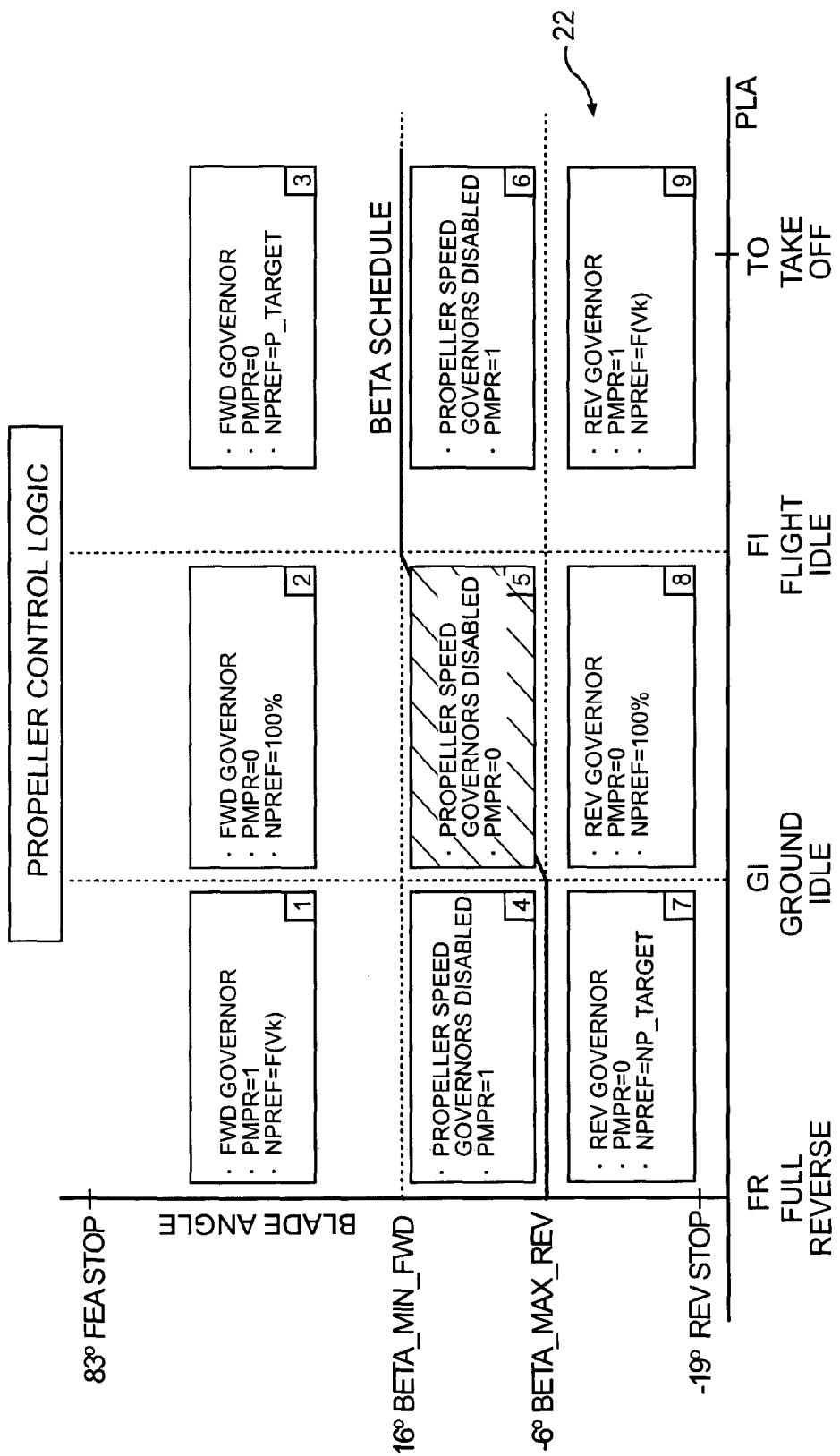
FIG. 3 is a graphical representation of a Cp curve (propeller power coefficient versus propeller blade angle for a given advance ratio)
Figure 4:
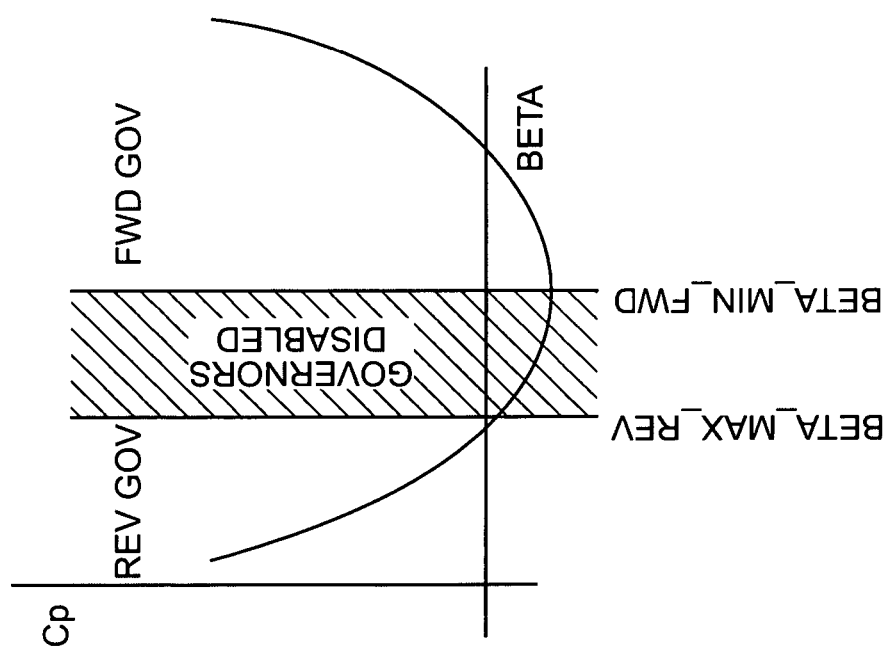
FIG. 4 is an schematic block diagram of a propeller pitch control logic system.

Referring to FIG. 3, Forward governing is active above Beta_min_forward; Reverse Governing is active below Beta_max_reverse; and Governing disabled is selected therebetween. That is, the governors are disabled between the transition from forward to reverse governing when the blade pass through the bucket of the Cp curve (propeller power coefficient versus propeller blade angle for a given advance ratio) where propeller speed governing through pitch control is not possible (also illustrated in FIG. 4). On the right side of the Cp curve (where the curve has a positive slope), the speed governor must increase propeller blade angle (toward the feather stop) as input power is increased to maintain a fixed propeller speed. On the left side of the Cp curve (where the slope is negative), the governor must do the opposite—decrease blade angle (toward the reverse stop) to absorb added power to maintain propeller speed.

Once the governor state is selected (Forward governing active; Reverse governing active; or Governors disabled), the reference propeller speed (NPREF) is determined by the particular PCM cell which has been looked-up within the PCM map. The governing target speed is either: the pilot selected speed (NPREF=NP_TARGET), a ground default of 100% (NPREF=100%), or a speed that is a function of airspeed for transitions during aborted take-offs and high speed landings (NPREF=F(VK)).

The status of the propeller minimum power request (PMPR) that is issued to the engine control logic subsystem 24 is also determined by the PCM cell. A request (PMPR=1), when made, will cause the engine control logic subsystem 24 to diminish engine power output to a minimum such as idle to maintain safe operation of the engine where propeller speed governing through pitch control is not effective. That is, when PMPR=1, the engine is commanded to the maximum of the minimum limiting control loops such as the min allowable gas generator rotational speed (NHMIN) or min allowable power turbine speed (NPTUSG) rather than the commanded PLA signal. This is the coordination link between the propeller control logic subsystem 22 and the engine control logic subsystem 24 (FIG. 2) that provides for a smooth transition into and out of reverse at high airspeeds.

Figure 5A:
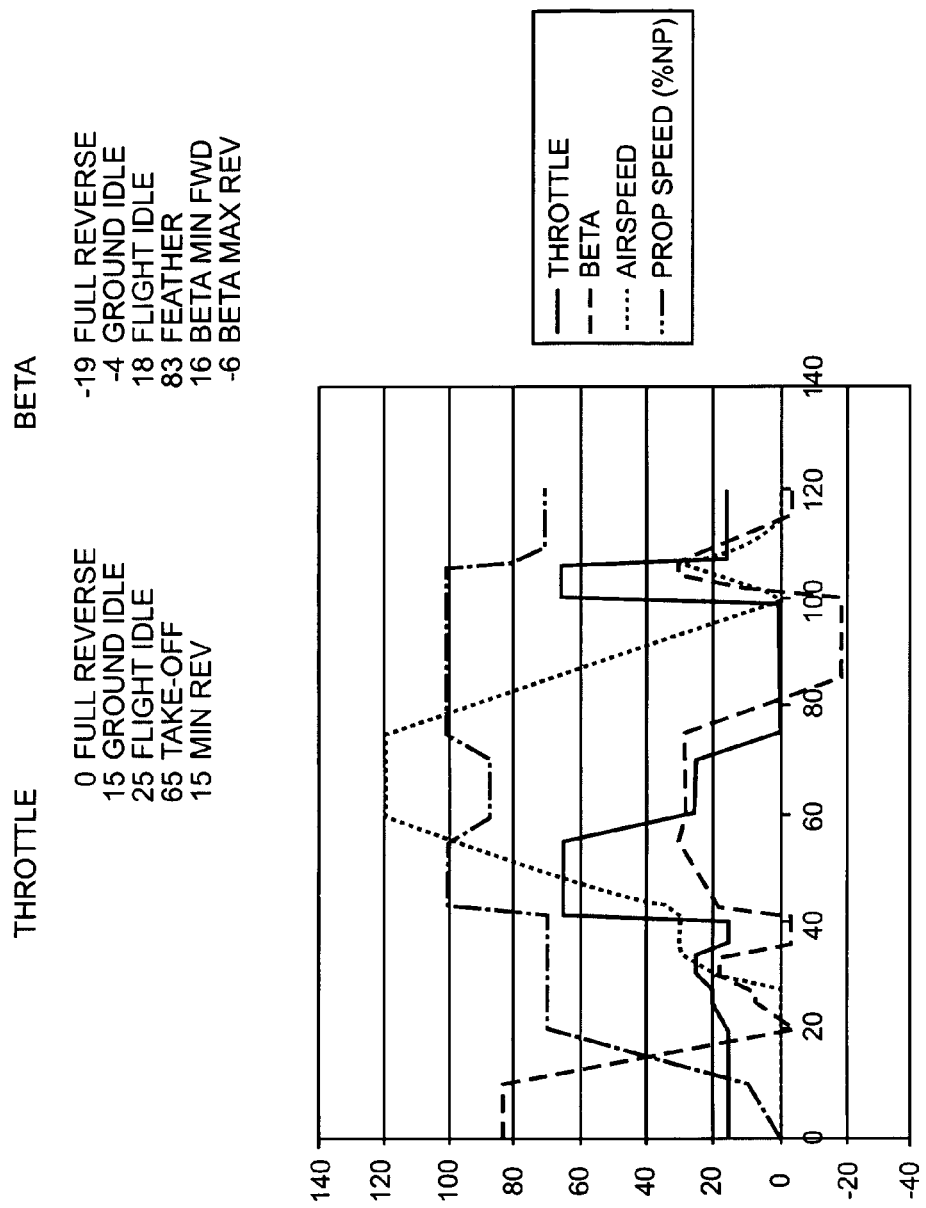
FIG. 5A is a graphical representation of an exemplary aircraft flight which graphically represents propeller pitch control parameters.
Figure 5B:
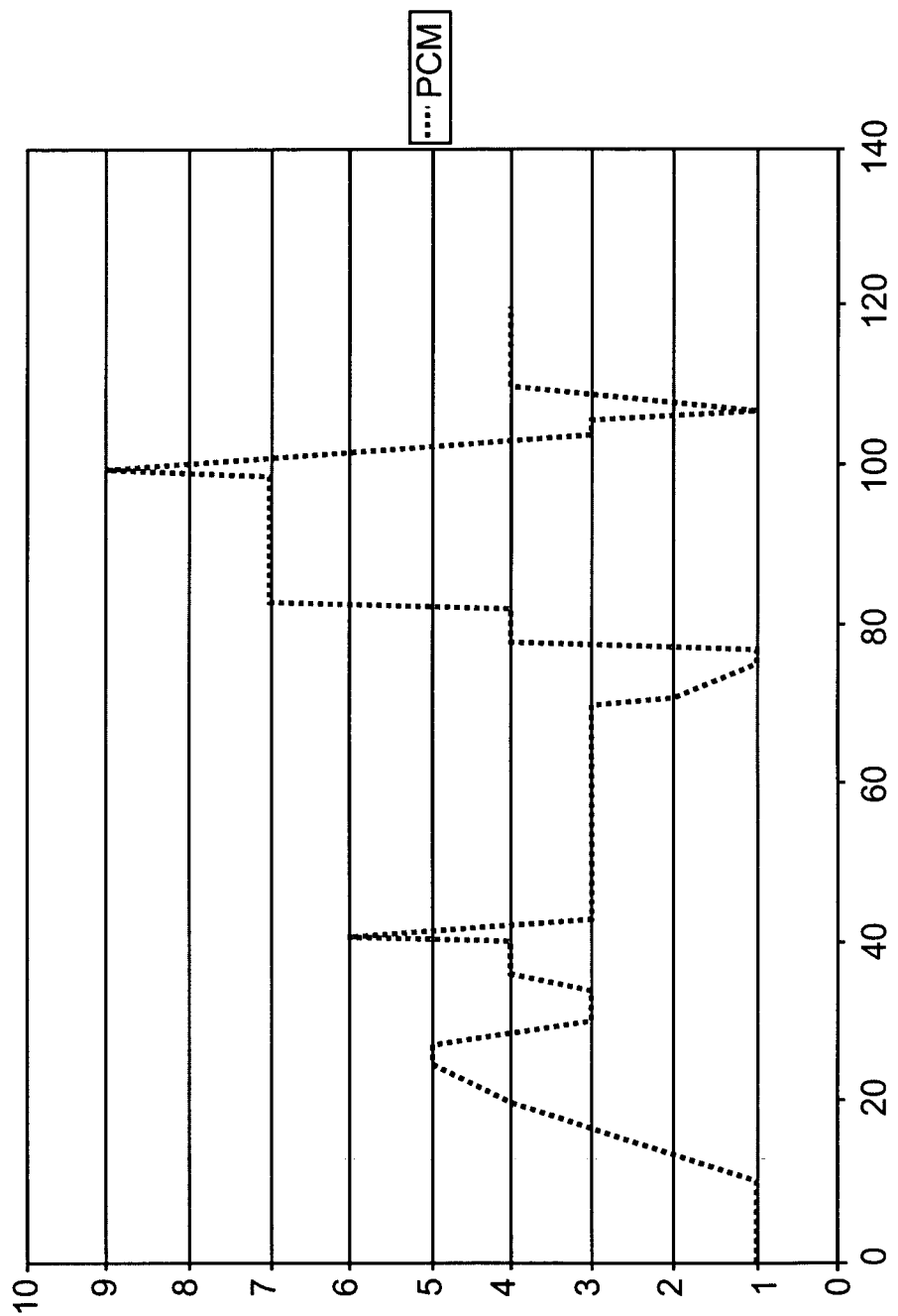
FIG. 5B is a graphical representation of PCMs for the exemplary aircraft flight of FIG. 5A.

Referring To FIGS. 5A, 5B, and 5C, an example aircraft flight is described to illustrate the functioning of the propeller control system 20. The example aircraft flight begins with the propeller blades 18 in feather with a Beta value of approximately 83 degrees, the throttle at GI, and the propeller speed=0% NP (the normal shutdown state). In this state, the PCM cell within the PCM map (FIG. 3) will be PCM 1. As the propeller is unfeathered after engine start, the blade angle decreases to the GI position of approximately −4 degrees. The associated PCM cell transitions from PCM 1 to PCM 4.

As the aircraft starts to taxi at time 25, PLA (throttle) is increased and blade angle is increased such that the PCM passes through PCM 5 then transitions to PCM 3. Notably, as PLA is increased from GI toward FI during taxi, the blade angle increases from the GI Beta value of approximately −4 degrees to a FI Beta value of approximately 18 degrees to propel the aircraft during taxi, such that the PCM passes through PCM 5. The PCM then transitions back to PCM 4 in response to the throttle being again reduced.

When take-off is commanded and PLA goes to 65 (TO) at approximately time 41, the PCM transitions to PCM 6 then to PCM 3. PCM 3 is typical for cruise at which PLA is maintained at or above FI.

On landing and reverse application, PCM transitions from PCM 3 through PCM 2 then to PCM 1 when reverse is requested. From PCM 1, the PCM transitions through PCM 4 then to PCM 7 as full reverse is attained by the propeller blades at approximately time 85.

When take-off power is again commanded—such as to taxi off a runway—PLA goes to 65 (TO) at approximately time 100, PCM transitions from PCM 7 through PCM 8 then to PCM 9. From PCM 9, the PCM transitions through PCM 6 then back to PCM 3.

When PLA ground idle (GI) is again commanded through PLA position, the PCM transitions from PCM 3 through PCM 1 and then to PCM 4.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of transitioning between forward and reverse governing of a propeller system comprising the steps of:
    determining a power level angle;
    determining a propeller blade angle; and
        looking up a Propeller Control Mode cell from a Propeller Control Mode map in response to the power level angle and the propeller blade angle;
    transitioning from a forward governing range to a reverse governing range on the propeller control mode map in response to the propeller blade angle reaching a minimum forward blade angle or transitioning from the reverse governing range to the forward governing range on the propeller control mode map in response to the propeller blade angle reaching a maximum reverse blade angle;
    passing through a speed governors disabled mode cell on the Propeller Control Mode map while transitioning during which propeller speed is not controlled;
    resuming propeller speed governing in either the forward speed governing range or the reverse speed governing range on the Propeller Control Mode map after passing through the speed governors disabled mode cell;
    looking up a propeller min power request from the propeller control mode map; and
    communicating the propeller min power request to an engine control logic system.

2. The method as recited in claim 1, further comprising the steps of:
    looking up a reference propeller speed on the Propeller Control Mode map;
    communicating the reference propeller speed to the engine control logic subsystem.

3. A method of transitioning between forward and reverse governing of a propeller system comprising the steps of:
    determining a minimum blade angle permitted for forward speed governing from a Propeller Control Mode map which relates a Power Lever Angle to a propeller blade angle;
    determining a maximum blade angle allowed for reverse speed governing from the Propeller Control Mode map which relates the Power Lever Angle to the propeller blade angle;
    determining when the propeller reaches the minimum blade angle permitted for forward speed governing or the maximum blade angle permitted for reverse speed governing;
    transitioning from the forward governing range to the reverse governing range on the propeller control mode map in response to the propeller blade angle reaching the minimum forward blade angle or transitioning from the reverse governing range to the forward governing range on the propeller control mode map in response to the propeller blade angle reaching the maximum reverse blade angle;
    passing through a speed governors disabled mode cell on the Propeller Control Mode map while transitioning during which propeller speed is not controlled;
    resuming propeller speed governing in either the forward speed governing range or the reverse speed governing range on the Propeller Control Mode map after passing through the speed governors disabled mode cell; and
    determining a propeller minimum power request by looking up a Propeller Control Mode cell from the Propeller Control Mode map.

4. A method as recited in claim 3, further comprising the step of:
    determining a reference propeller speed by looking up a Propeller Control Mode cell from the Propeller Control Mode map.

5. A method as recited in claim 3, further comprising the step of:
    determining a governor state by looking up a Propeller Control Mode cell from the Propeller Control Mode map.

* * * * *